(No Model.)  2 Sheets—Sheet 1.
J. B. SECOR.
DEVICE FOR OPERATING TOOL HOLDING TURRETS.
No. 253,774.  Patented Feb. 14, 1882.
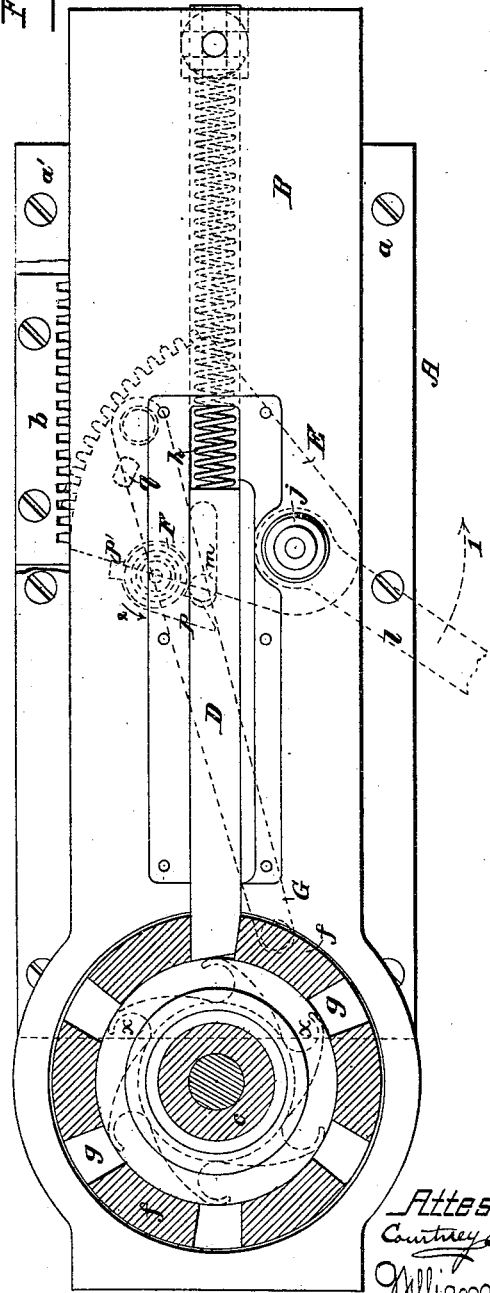
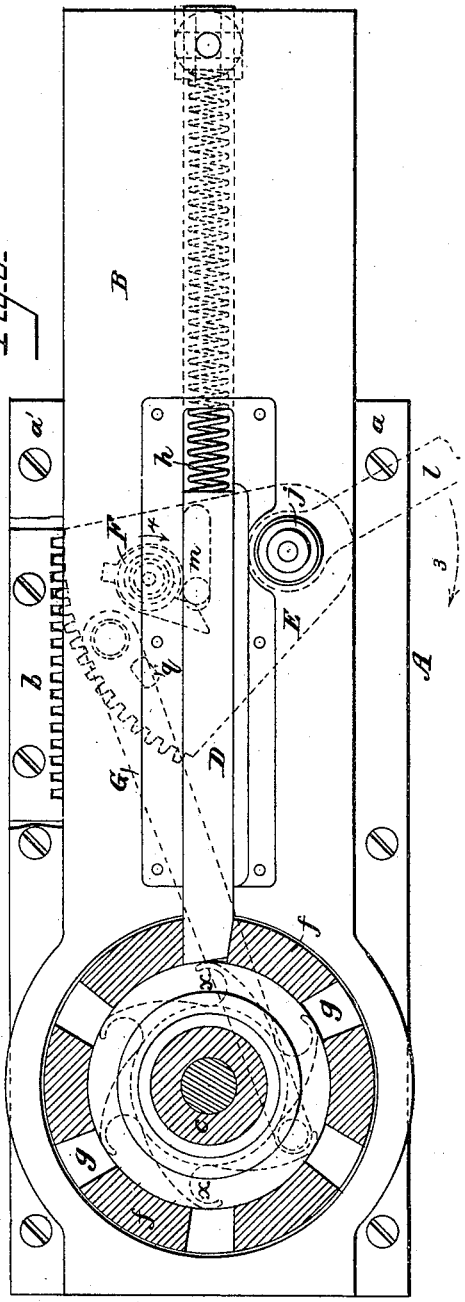
Attest:
Courtney A. Cooper.
William Paxton.
Jerome B. Secor
By his Attorney
Chas. E. Foster.

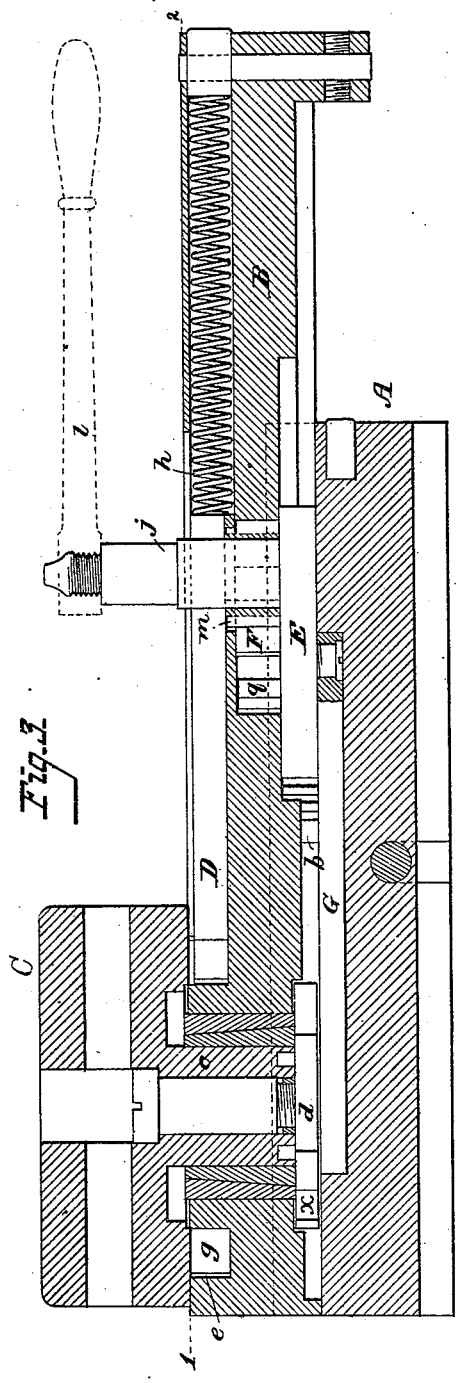

UNITED STATES PATENT OFFICE.

JEROME B. SECOR, OF BRIDGEPORT, CONNECTICUT.

DEVICE FOR OPERATING TOOL-HOLDING TURRETS.

SPECIFICATION forming part of Letters Patent No. 253,774, dated February 14, 1882.

Application filed August 3, 1881. (No model.)

*To all whom it may concern:*

Be it known that I, JEROME B. SECOR, of Bridgeport, Fairfield county, Connecticut, have invented an Improvement in Lathe Attachments, of which the following is the specification.

My invention consists of devices whereby the turret of a lathe may be moved back and forth, revolved, and locked and unlocked with facility.

In the drawings, Figure 1 is a sectional plan, showing the turret, slide, and bed with attachments; Fig. 2, the same as Fig. 1, the parts in a different position; Fig. 3, a sectional elevation; Fig. 4, a plan of parts detached.

A is the bed, in which the slide B, carrying the turret C, moves, a and a' being the guides, one of which is provided with teeth, forming a rack, b. The shank c of the turret extends through an opening in the slide, and carries at the lower end a ratchet-wheel, d, and an annular flange, f, projecting from the under side of the head of the turret, enters an annular recess, e, in the slide. In the flange f are notches g, adapted to receive the end of a bolt, D, which slides in a groove in the upper face of the slide B, and is pressed toward the turret by a spring, h. The under face of the slide B is recessed to receive a segment, E, which is secured to a spindle, j, turning in the slide B, and provided at the upper end with a handle, l. The segment is toothed, the teeth meshing with those of the rack b, so that by pushing the handle l in one direction or the other the slide B will be carried back or forth between the guides a a'. In a recess in the slide B, above the segment E, is pivoted by a bolt a lever, F, the long arm p of which bears upon a pin, m, of the bolt D, while the short arm p' is in a position to be struck by a stud, q, on the segment E when the latter swings upon its pivot.

An arm, G, with an end stud, engages with the teeth of the ratchet-wheel d, and serves to turn the latter and the turret a partial revolution as the slide moves back. This arm may be pivoted at the opposite end to a fixed stud; but I prefer to pivot it to the segment E, as shown, so that as the segment is moved, carrying back the slide, it also pushes forward the arm, giving thereby a more extended movement than would result from the use of an arm connected to a fixed pivot.

The turret is provided with means for securing any of the desired tools or operating devices, and when in the position shown in Fig. 1 is locked securely by the bolt D. By now swinging the arm l in the direction of the arrow 1, Fig. 1, the segment, acting on the rack as a fulcrum, is turned and carries the slide and turret back from the face-plate of the lathe without any variation of the leverage. After the slide has been thus carried a short distance the lever F is brought with its arm p' against the lug q, the lever being thereby swung round in the direction of the arrow 2, until the arm p' escapes from the stud, and the bolt D being thereby pushed back until its end passes from the recess g in which it was situated. The continued backward movement brings the tooth x of the ratchet-wheel d against the stud or end of the arm G and revolves the turret. As the turret is turned the arm p of the lever F escapes from the pin m of the bolt D, which is then thrown forward by its spring until it strikes the flange f and slips into the next notch g, when the latter is brought opposite the bolt by the continued revolution of the turret. The parts will now be in the position shown by Fig. 2. The turret is moved back by swinging the lever l in the direction of the arrow 3, when the slide B will move forward, the arm p' will strike the lug q, turning the lever in the direction of the arrow 4, and finally passing from the lever, and all parts will assume the position shown in Fig. 1. The slide B and its turret are thus carried back or forth. The turret is locked most securely until it is to be turned, when it is unlocked with facility, and the turning is effected in the proper time and to the exact extent required, the whole result being secured by a single movement of the lever l.

It will be obvious that the lever l may be replaced by any equivalent device for swinging the segment. I further contemplate the use of different devices for drawing back the bolt D on the movement of the segment. It will also be apparent that some of the devices described may be used without the others on application to machines of ordinary construction.

Instead of a toothed segment and rack, a segment with crossed flexible bands bolted to the segment and to the guide $a'$ may be used.

I claim—

1. The combination, with a slide, B, and its bed A and turret, of the rack $b$ on the bed and segment E, pivoted to the slide, and segment-lever $l$, substantially as set forth.

2. The combination, with the slide, turret, and segment E, of the arm G, adapted to engage with the ratchet-wheel $d$, substantially as set forth.

3. The combination, with the slide, segment, and turret having a ratchet-wheel, $d$, of the arm G, adapted to the teeth of said wheel and pivoted to the segment, substantially as set forth.

4. The combination, with the slide and revolving turret having notches $g$, of a spring-bolt, D, carried by the slide, a lever, F, engaging with said bolt, and a segment, E, provided with a stud, $q$, arranged to strike and turn the lever to retract the bolt as the segment is turned, substantially as described.

In testimony whereof I have signed my name to this specification in the presence of two subscribing witnesses.

J. B. SECOR.

Witnesses:
CHARLES E. FOSTER,
H. F. NORCROSS.